(12) United States Patent
Eldredge et al.

(10) Patent No.: US 6,590,850 B2
(45) Date of Patent: Jul. 8, 2003

(54) PACKAGING FOR STORAGE DEVICES USING ELECTRON EMISSIONS

(75) Inventors: Kenneth J. Eldredge, Boise, ID (US); Winston C. Mitchell, Boise, ID (US); Steven L. Naberhuis, Fremont, CA (US); Chung Ching Yang, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 94 days.

(21) Appl. No.: 09/800,561

(22) Filed: Mar. 7, 2001

(65) Prior Publication Data

US 2002/0126615 A1 Sep. 12, 2002

(51) Int. Cl.[7] .................................................. G11B 7/00
(52) U.S. Cl. ...................................................... 369/101
(58) Field of Search ................................ 369/101, 100, 369/44.11, 43, 44.14, 44.37, 121, 124.03, 124.09, 126; 365/118, 128, 151

(56) References Cited

U.S. PATENT DOCUMENTS 5,557,596 A  9/1996 Gibson et al. .............. 369/101
5,986,381 A  11/1999 Hoen et al. ................. 310/309

Primary Examiner—Paul W. Huber

(57) ABSTRACT

An information storage unit functioning in a vacuum is provided wherein a data storage medium has an information storage area for storing and reading information thereon. An array of electron beam emitters is spaced from and in close proximity to the data storage medium for selectively directing a plurality of electron beams toward the data storage medium. Focusing optics between the array of electron beam emitters and the data storage medium focus each of the electron beams on one part of the information storage area of the data storage medium. A micro electromechanical motor associated with the data storage medium moves the data storage medium relative to the array of electron beam emitters, so that each of the emitters directs an electron beam selectively to a portion of the information storage area to read or write information therein. Electronic circuitry spaced from and in electronic communication with the array of electron beam emitters controls the operations of the array of electron beam emitters. A vacuum device in the information storage unit maintains the vacuum between the data storage medium and the array of electron beam emitters.

26 Claims, 4 Drawing Sheets

PACKAGING FOR STORAGE DEVICES USING ELECTRON EMISSIONS

BACKGROUND OF THE INVENTION

1. Field of Invention

The present invention pertains to the field of information storage units. More particularly, this invention relates to providing an information storage unit using an array of electron beam emitters and an information storage medium movable relative to the emitters using a micro electro mechanical system.

2. Background

Electronic devices, such as palm computers, digital cameras and cellular telephones, are becoming more compact and miniature, even as they incorporate more sophisticated data processing and storage circuitry. Moreover, types of digital communication other than text are becoming much more common, such as video, audio and graphics, requiring massive amounts of data to convey the complex information inherent therein. These developments have created an enormous demand for new storage technologies that are capable of handling more complex data at a lower cost and in a much more compact package.

One response to this demand has been the development of ultra-high density storage devices, such as the one described in U.S. Pat. No. 5,557,596 granted to Gibson et al. on Sep. 17, 1996. This system provides for a plurality of electron emitters generating beams of electrons to information storage media areas on a movable rotor device to store and retrieve information. A micro mover, based on micro electro mechanical systems (MEMS) technology moves the rotor device relative to the electron emitters to enable parallel communications with selected storage media areas on the rotor. In the Gibson et al patent, an electron beam impacts storage media areas at different intensities, selectively altering some aspects of the storage material, such as by changing the state of the storage material between amorphous and crystalline phases or between different crystalline phases that could affect the conductivity of a diode device, for example.

There is a continued need for increased miniaturization and expanded ability to handle greater quantities of more complex data at a faster speed and in even more compact areas. Efforts are now underway to adapt technology disclosed in the Gibson et al patent to enable the storage of data on scale of nanometers to tens of nanometers, referred to as atomic resolution storage (ARS).

Several challenges arise in attempting to store data at this ARS level. The processes of information storage and retrieval are difficult tasks. Electron beams from emitters are too diffuse to impact ARS storage sites without being modified. On the ARS scale, reading and writing by electron beams are increasingly delicate operations much more likely to be affected by stray electrons, atoms or molecules. Establishing and maintaining a vacuum in the storage media areas are critical.

SUMMARY OF THE INVENTION

The present invention provides for an ARS package using electron emitters for information processing and providing information access by the movement of MEMS devices. Information is stored by multiple emitter devices providing tightly focused electron beams on storage media areas disposed on the surface of a movable rotor device. To function at the ARS level, the electron beams are focused by electron optics. Multiple parallel operations are conducted by a plurality of electron emitters selectively applying simultaneous electron beams on the storage media areas.

The rotor is moved relative to the emitters by a MEMS motor disposed on the rotor and a stator spaced adjacent to the rotor. Most of the electronics for the emitters and the rotor are disposed on the stationary stator, enabling greater density of electron beams from the emitter and storage media areas on the rotor.

The electronic control circuitry for the rotor and emitter are disposed primarily on the stator. The circuitry communicates between the emitter and the stator by conductive plugs on the rotor connecting to electrical pads on the stator and the emitter. Electrical leads extend from the ARS package to external connections to remote systems.

The ARS package of the present invention provides for spacers between the rotor and the emitter and between the rotor and the stator to maintain crucial spacing between these components. The rotor, emitter and stator are bonded together to form an integral unit. The ARS package is necessarily sealed to form a vacuum, so that electron emission can occur in controlled conditions in which the undesirable side effects of ionizing stray atoms or molecules are minimized. A getter is provided at a single location or distributed throughout the ARS package to maintain a substantial vacuum within the package.

One preferred embodiment provides an information storage unit functioning in a vacuum, wherein a data storage medium has an information storage area for storing and reading information thereon. An array of electron beam emitters is spaced from and in close proximity to the data storage medium for selectively directing a plurality of electron beams toward the data storage medium. Focusing optics between the array of electron beam emitters and the data storage medium focus each of the electron beams on one part of the information storage area of the data storage medium. A micro electromechanical motor associated with the data storage medium moves the data storage medium relative to the array of electron beam emitters, so that each of the emitters directs an electron beam selectively to a portion of the information storage area to read or write information therein. Electronic circuitry spaced from and in electronic communication with the array of electron beam emitters controls the operations of the array of electron beam emitters. A vacuum device in the information storage unit maintains the vacuum between the data storage medium and the array of electron beam emitters.

Another preferred embodiment provides an atomic resolution information storage unit, wherein a planar rotor device has an information storage area thereon for storing information. A planar array of electron beam emitters in close proximity to the rotor device selectively directs electron beams to the information storage area on the rotor device. Focusing optics between the array of electron beam emitters and the planar rotor device focus the plurality of electron beams each on one portion of the information storage area of the planar rotor device. A driven mechanism on the rotor device causes the rotor device to move relative to the array of electron beam emitters in a plane parallel to the plane of said array of electron beam emitters. A stator device is disposed in close proximity to the rotor device and is stationary relative to the moveable rotor device. A driver mechanism on the stator device electrostatically engages the driven mechanism to move the rotor device relative to the array of electron beam emitters, thereby enabling the array of electron beam emitters to read from or write to different portions of the information storage area on the rotor device. Electronic control circuitry is disposed on the stator device in electrical communication with the array of electron beam emitters to control the operation of the array of electron beam emitters. A vacuum device in the atomic resolution information storage unit maintains a vacuum between the information storage area and the array of electron beam emitters.

Multiple MEMS motors may be employed in the present invention to increase the capabilities of the system operation. In such case, the operation of the MEMS motors may be either coordinated or independent, depending on the application.

Other aspects and advantages of the present invention will become apparent from the following detailed description, which in conjunction with the accompanying drawings illustrates by way of example the principles of the present invention.

DETAILED DESCRIPTION OF THE INVENTION

Figure 1:
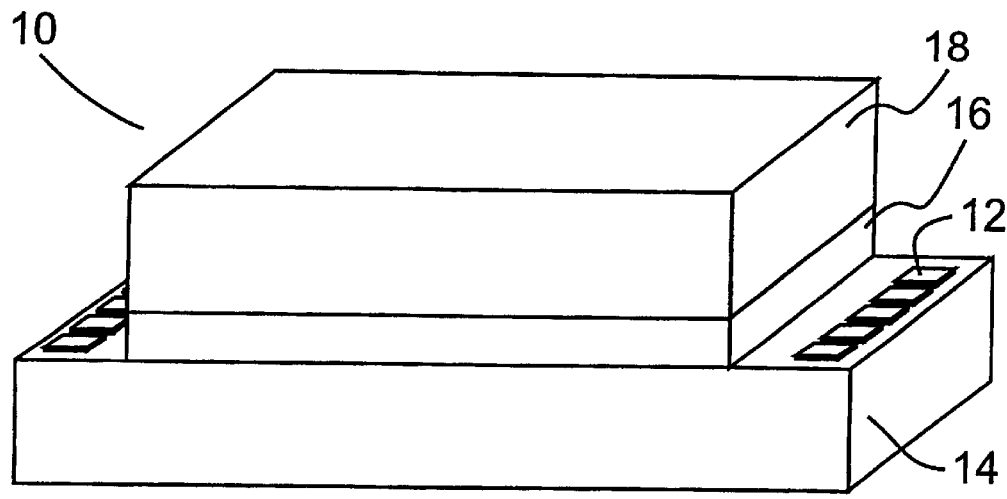
FIG. 1 is a schematic perspective front view of the ARS package of a preferred embodiment of the present invention.

With reference to FIG. 1, the atomic resolution storage package of a preferred embodiment of the present invention is shown. As used herein, atomic resolution storage, or ARS, refers to storing and retrieving information where storage media support densities are greater than about 100 gigabits per square inch and electron beams are focused by electron optics. It is also preferable but not required to employ precise MEMS motors for accessing storage media areas; scanning beams could accomplish the same effect.

FIG. 1 shows the assembled ARS package or module 10 with contact pads 12 for interconnection to an external circuit. Module 10 comprises three stacked wafers, the stator wafer 14, the rotor wafer 16 and the emitter wafer 18. The wafers are preferably manufactured by standard semiconductor and MEMS micro-fabrication processes and have approximately the same X–Y dimensions. The ARS package 10 is preferably vacuum sealed with the wafers being spaced apart and bonded together to form an integral package.

In one preferred embodiment, the X and Y dimensions of the wafers are approximately one centimeter and the Z dimension of module 10 is approximately one millimeter. The X and Y dimensions may each vary considerably and are not required to be equal to each other. Pads 12 can vary in number and size and are preferably located on both sides of the module to maintain low stresses in mounting module 10 to external interconnects.

The stator wafer 14 and rotor wafer 16 each have a set of electrodes that function together to comprise a micro electromechanical system (MEMS) motor that causes the rotor wafer 16 to move relative to the stator wafer 14 and to the emitter wafer 18 in a plane parallel to the planes of the three wafers. The rotor wafer 16 contains a storage media area for storing a vast amount of data. The emitter wafer 18 includes a plurality of electron emitters that transmit electron beams to the storage media areas for reading, writing and modifying information thereon.

The stator wafer 14 contains read/write electronic circuitry for sending signals to control the operation of the electron emitters. The control signals are passed from the stator wafer 14 through the rotor water 16 to the emitter wafer 18 without interfering with movement of the rotor wafer.

One preferred embodiment of the MEMS motor is the type described in U.S. Pat. No. 5,986,381 granted to Hoen et al. on Nov. 16, 1999. The stator wafer 14 preferably contains driver electrodes in proximity to corresponding driven electrodes on rotor wafer 16. Alternating voltage signals on the driver electrodes interact with the driven electrodes to cause the rotor wafer 16 to move in-plane. Out of plane forces are preferably minimized by applying alternating voltage patterns to the electrodes and by controlling the pitch of the electrodes, as described in the Hoen et al '381 patent.

Figure 2:
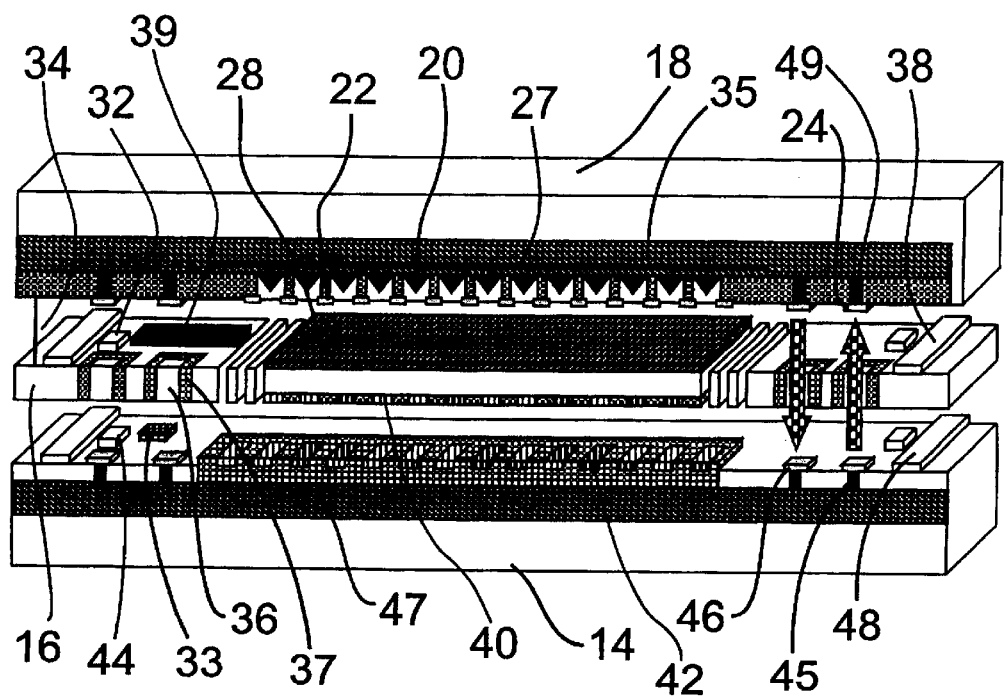
FIG. 2 is an exploded schematic perspective frontal view of the ARS package shown in FIG. 1.
Figure 3:
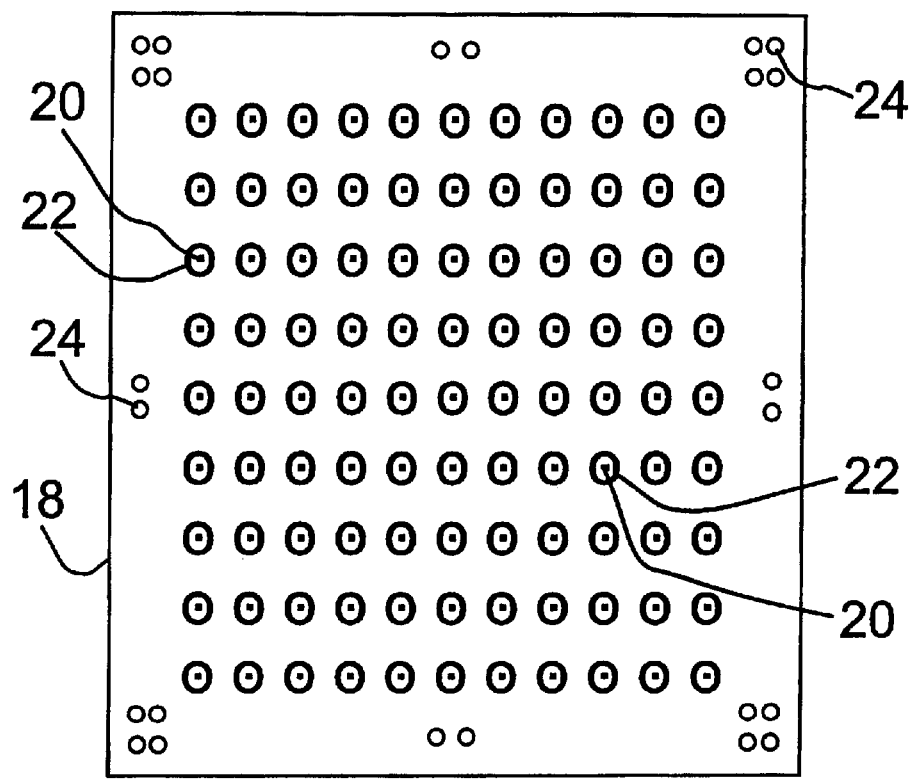
FIG. 3 is a bottom plan view of the emitter wafer of the ARS package of FIG. 1.

Referring now to FIG. 2, an exploded, cross-sectional view of module 10 is shown. Many of the key components of the ARS module can be configured based on the disclosure herein, consistent with the concepts in the storage device depicted in the Gibson et al '596 patent. Emitter wafer 18 supports a plurality of electron beam emitters 20, for example tip emitters. Tip emitters and their associated electron optics for focusing the electron beams are provided to direct a narrow, focused beam of electrons toward the rotor wafer 16. Preferably, the emitter points have radii of curvature of about one nanometer to hundreds of nanometers. Each emitter has a circular extractor electrode 22 surrounding it with a pre-selected potential difference applied between the emitter and the extractor electrode. An additional electrode or electrodes for focusing the electron beams are not shown and are the subject of co-pending patent applications.

A voltage may also be applied to the storage medium on the rotor wafer to accelerate the electron beam or to aid in focusing the electrons. Alternately, the electron emitter can be held at a high negative potential and the storage medium can be at or close to ground potential.

As an alternative embodiment to tip field electron emitters, flat emitters can be used with proper focusing, where the flat emitters can be configured based on metal insulator semiconductor (MIS) technology or metal insulator metal (MIM) technology. Details of the experimental use of flat emitters are provided in applicant's co-pending patent applications on flat emitters.

Emitter wafer 18 also includes driving electronics 27 and multiplexing electronics 35 for operating and selecting the emitters. Conductive pads 24 are mounted on the undersurface of emitter wafer 18 facing toward rotor wafer 16 to connect between the driving and multiplexing electronics and the leads coming from the stator wafer, as described below.

Figure 4:
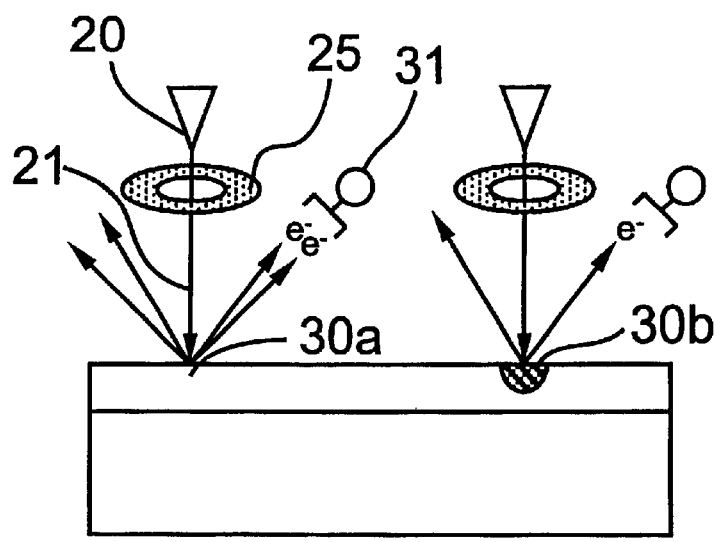
FIG. 4 is a depiction of the information storage media areas on the rotor wafer of the ARS package of FIG. 1, showing electron beam emitters reading from the storage media areas.

As depicted in FIG. 4, the rotor wafer 16 has deposited on it a storage medium 28 with unwritten areas 30a and written storage bits 30b on or near the surface of the storage medium 28. If the intensity of an electron beam 21 is sufficient, a storage bit 30b is written. Reading both written storage bits 30b and unwritten areas 30a can be accomplished according to the Gibson et al '596 patent by detecting changes in secondary electron emission between the storage bits 30b and the unwritten areas 30a through the use of proximal electron detectors 31. Any given electron beam is focused by appropriate electron optics 25 that include the extractor electrode 22. With the movement of the rotor part of the MEMS motor, a significant storage area (both unwritten areas 30a and written bits 30b) can be addressed by a given reduced intensity electron beam 21 and read by the associated electron detector 31. Likewise, with the movement of the rotor, any given area can be written or overwritten with new data with its corresponding electron beam 21.

Alternately, the storage media areas 30 may be semiconductor structures comprising diodes that are altered by the impact of electron beams to change one or more electronic properties of the diodes, thereby signifying the presence of a zero or a one. The surface of a selected diode is struck by an electron beam from a corresponding electron emitter so that the collection efficiency for minority carriers generated near the altered region is changed. The presence of the altered state is read by determining the amount of current flowing through the diode when a biasing voltage is impressed across the diode. This preferred embodiment is implied in FIGS. 2, 3, 5–8. In this preferred embodiment the data is determined by measuring the amount of current flow across the diode and is read by electronic circuitry on the stator device.

Electron optics 25 are preferably of a known type, such as described in co-pending U.S. patent application Ser. No. 09/617,876 entitled "Self-aligned Electronic Source Device," filed on Jul. 17, 2000.

The rotor wafer 16 also has spacers 32 on the periphery of each MEMS motor that determine the distance 34 between the rotor wafer and the emitter wafer. It should be understood that one or a plurality of MEMS motors can be incorporated in the ARS package. Preferably, the electron beam is highly focused and has an acceptable depth of focus, so that the distance 34 is not critical and can vary between hundredths of a micrometer to tens of micrometers in length, depending on the depth of focus. For optimal performance, the distance 34 is preferably in the range of one to ten microns, although distance 34 could be greater with the use of increasingly complex electron optics.

Figure 5:
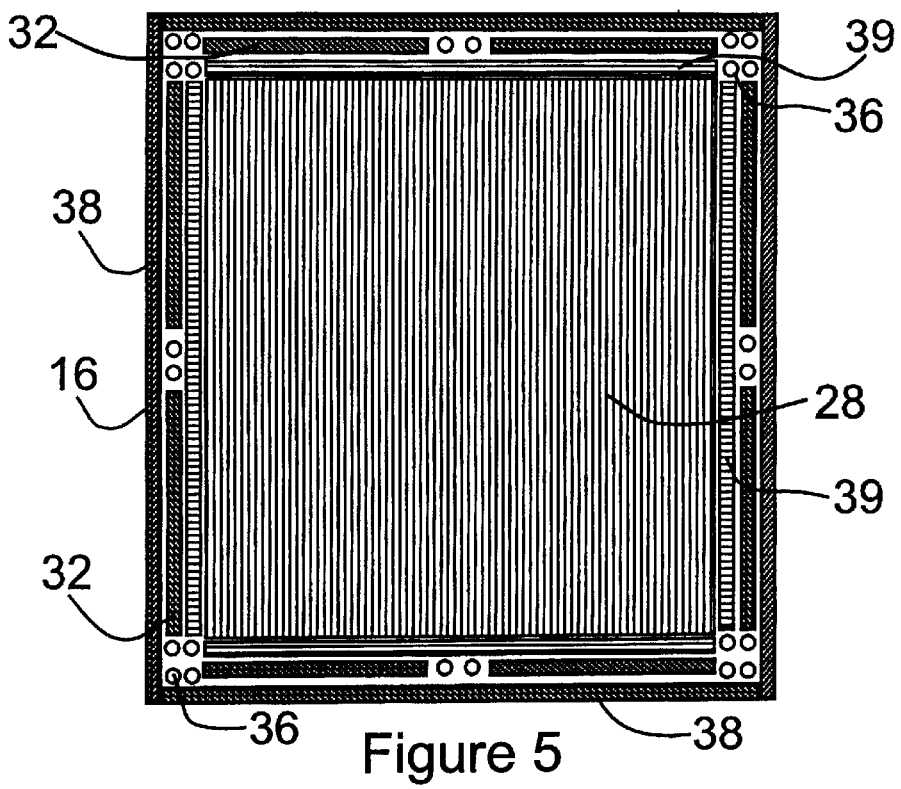
FIG. 5 is a top plan view of the rotor wafer of the ARS package shown in FIG. 1.
Figure 6:
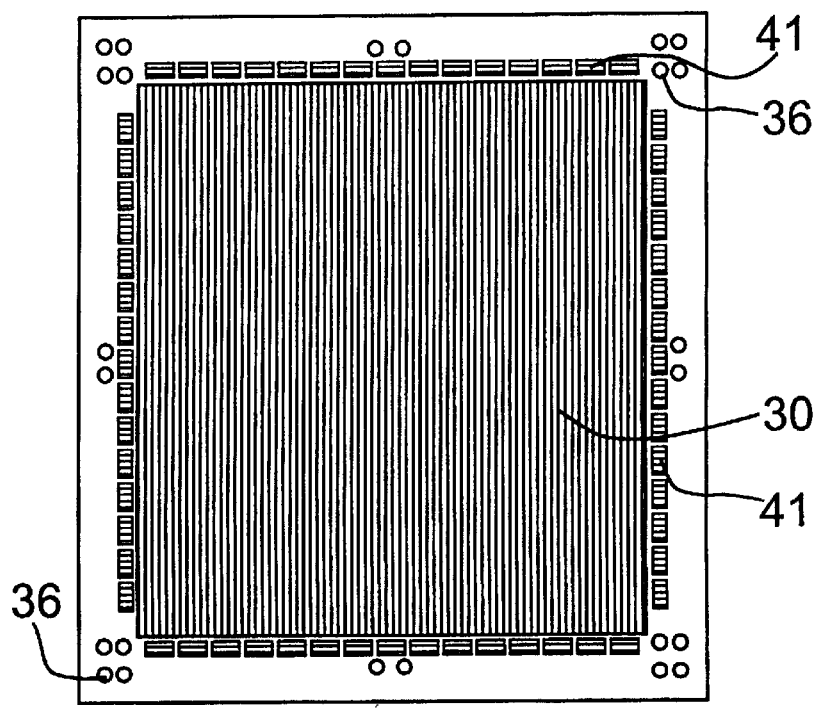
FIG. 6 is a bottom plan view of the rotor wafer of the ARS package shown in FIG. 1.

As shown in FIGS. 5–6, rotor wafer 16 also includes a plurality of conductive plugs 36 providing for electrical connections between the electronic circuitry on stator wafer 14 and the emitter control electronics 35 on emitter wafer 18. As shown in FIG. 2, each plug 36 is surrounded by insulating materials 37. Electrical leads 45 extend from the connector pads 46 on the stator wafer 14 to the control electronics 47 on stator wafer 14. Likewise, electrical leads 49 extend from the connector pads 24 on the emitter wafer 18 to the emitter control electronics 35 on the emitter wafer 18. Plug 36 is preferably of a conductive silicon or other metal that is solid below 200 degrees C. and can operate safely at 80 degrees C. or less. The checkered arrows shown in FIG. 2 represent the flow of information to and from the emitter and stator electronics.

Driven electrodes 40 are strategically positioned on the undersurface of the rotor wafer 16 facing stator wafer 14. As seen in FIG. 2, the portion of the MEMS motor 31 on the stator wafer 14 is comprised of a set of electrodes 42 mounted on the upper surface of the stator wafer 14 to correspond to the set of electrodes 40 on rotor wafer 16. Driver electrodes 42 and driven electrodes 40 are part of the MEMS motor driving the in-plane movement of the rotor wafer relative to the stator and emitter wafers. Stator wafer 14 also has spacers 44 similar to the spacers 32 on the rotor wafer. Spacers 44 determine the distance between the rotor and stator wafers.

Stator wafer 14 also supports most of the electrical control and drive circuitry, so as to minimize the amount of circuitry needed on the emitter wafer and minimize or eliminate the CMOS circuitry on the rotor wafer. This approach simplifies the manufacturing process and leaves more room on the emitter and rotor wafers for emitters and storage media areas, respectively. Conductive pads 46 on the stator surface are disposed to align with conductive plugs 36 on rotor wafer 16 to connect the circuitry on stator 14 to the circuitry on emitter 18.

There are likewise pads 33 on the rotor wafer 16 to connect to the stator wafer 14. The stator wafer has connections to the bottom of the rotor wafer 16 to communicate with the MEMS motor and to the top of rotor wafer 16 to connect to the storage medium 28.

Spacers 32 may be manufactured integral with the rotor wafer 16 or affixed separately thereto. Alternately, spacers 32 may be affixed to or integral with the emitter wafer 18. Likewise, spacers 44 may be integral with or affixed to the underside of rotor wafer 16 or the upper surface of stator wafer 14. The number, size and location of spacers 32 and 44 will vary depending on several factors, including whether a single MEMS motor or an array of motors is used. In the embodiment shown in FIGS. 6 and 7, a single motor is shown. In this case, the spacers are preferably peripheral to the moving part of the rotor wafer 16, and mounted near the edges of the rotor wafer. If multiple motors are used, the spacers are interspersed with the motors, but are always located outside the moving stages of the rotor.

Since electron beams are used as described herein, the ARS package must maintain a high vacuum. Preferably, the stator, rotor and emitter wafers are bonded together and a vacuum seal surrounds the periphery of the ARS package. Bonding can be accomplished through the formation of stable inter-metallic compounds, such as palladium silicide through the formation of eutectic metal alloys or other suitable mechanism. The seal can be of metal or other material that bonds the wafers together. Alternately, the seal can also be separate from the wafer-to-wafer bonding material.

Figure 7:
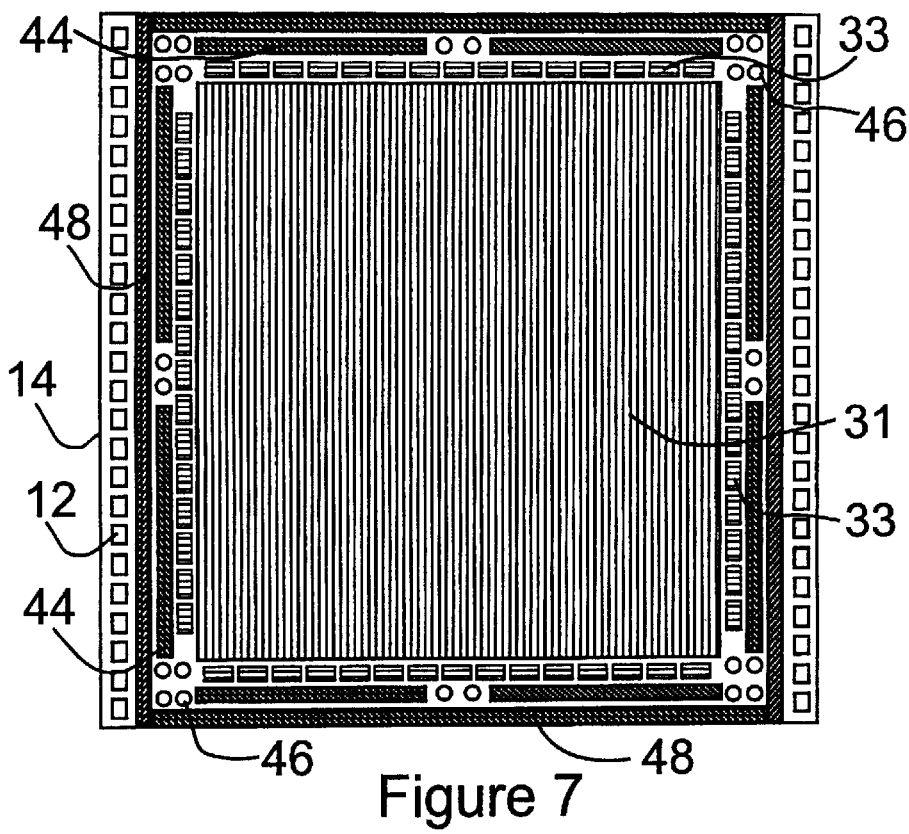
FIG. 7 is a top plan view of the stator wafer of the ARS package shown in FIG. 1.

In FIG. 2, the bonding and vacuum seals are combined. On the stator wafer 14, seal/bond structures 48, also shown in FIG. 7, are constructed. Likewise, on rotor wafer 16 or emitter wafer 18 wafer seal/bond structures 38 are fabricated.

The vacuum is preferably on the order of $10^2$ to $10^{-7}$ Torr and is maintained by one or more getters, such as getter 39 affixed or integral to the upper surface of the rotor wafer, as shown in FIG. 5. Getters can alternatively be affixed or integral to emitter wafer 18. The getters are preferably of conventional structure and materials, similar to getters used with vacuum tubes or in electron emission displays. The number, size, location and positioning of getters may vary depending upon ARS package requirements. The number of getters could increase with the implementation of additional MEMS motors.

The read and write channel and control electronics 17 on the stator wafer 14 are connected to the external connector pads 12 on the outside of the ARS package, as shown in FIG. 1. In addition, power supply connections are also made to pads 12. Emitter beam selection and control electronics are preferably located on the periphery of the emitter areas. The emitter driver electronics 27 are preferably located behind the emitters for tip electron emitter devices, and may be remote from the emitters for other types of emitter structures, such as flat emitters. The through-wafer conductive plugs 36 and electrical leads 45 and 49 convey power and control signals to the rotor wafer 16 and emitter wafer 18. Preferably, the control, channel and motor electronics are fabricated by standard MOS processes. High voltage CMOS or other known technology preferably provides the driver electronics for the electron emitters.

In order to conserve space, the channel, control and motor circuits are built underneath the MEMS motor driver electrodes on the stator wafer. Similarly, the emitter driver electronics 27 are preferably disposed behind the emitters.

Figure 8:
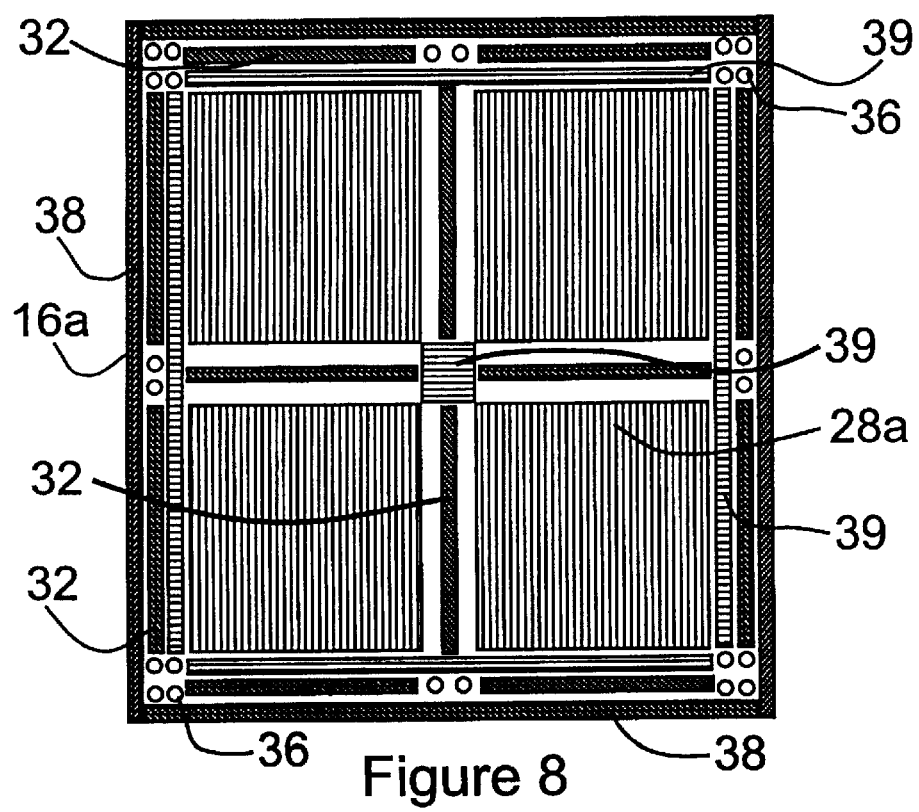
FIG. 8 is a top plan view of another embodiment of the rotor wafer of the ARS package according to the present invention.

FIG. 8 represents an alternative embodiment wherein the rotor wafer 16a has four media sections 28a instead of one section 28 shown in FIG. 5. In this embodiment, there are four MEMS motors (not shown) each operating one of the sections 28a according to the embodiment shown in FIGS. 5–7.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

We claim:

1. An information storage unit functioning in a vacuum, comprising:
    a data storage medium having an information storage area for storing and reading information thereon;
    an array of electron beam emitters spaced from and in close proximity to the data storage medium for selectively directing a plurality of electron beams toward the data storage medium;
    focusing optics between the array of electron beam emitters and the data storage medium to focus the plurality of electron beams each on one part of the information storage area of the data storage medium;
    a micro electromechanical motor associated with the data storage medium to move the data storage medium relative to the array of electron beam emitters, whereby each of said emitters directs an electron beam selectively to a portion of the information storage area to read or write information therein;
    electronic control circuitry spaced from and in electronic communication with the array of electron beam emitters to control the operations of the array of electron beam emitters; and
    a vacuum device in the information storage unit for maintaining the vacuum between the data storage medium and the array of electron beam emitters.

2. The information storage unit as recited in claim 1, wherein the micro electromechanical motor comprises a rotor device on which the data storage medium is affixed and a stator device in close proximity to the data storage medium, a set of driving electrodes mounted on said stator device to drive the rotor device and a set of driven electrodes mounted on the rotor device proximate to the first set of electrodes.

3. The information storage unit as recited in claim 2, wherein the electronic control circuitry is disposed on the stator device.

4. The information storage unit as recited in claim 3, wherein the electronic control circuitry on the stator device is in communication with the array of electron beam emitters through the rotor device.

5. The information storage unit as recited in claim 1, wherein the electronic control circuitry is in electronic communication with the micro electromechanical motor to also control the movement of the data storage medium relative to the array of electron beam emitters.

6. The information storage unit as recited in claim 1, wherein the data storage medium is movable relative to the array of electron beam emitters.

7. The information storage unit as recited in claim 2, and further comprising a bonding mechanism for connecting and spacing apart the array of electron beam emitters, rotor device and stator device to form an integral information storage package.

8. The information storage unit as recited in claim 7, and further comprising a sealing mechanism around the information storage package for maintaining the vacuum therein.

9. The information storage unit as recited in claim 8, wherein the bonding mechanism is integral with the sealing mechanism.

10. The information storage unit as recited in claim 8, and further comprising electrical leads extending from the information storage package through the sealing mechanism to communicate information from the information storage package to circuitry outside of the package.

11. The information storage unit as recited in claim 2, and further comprising controlling electronics for the microelectromechanical motor disposed on the stator device beneath the driving electrodes mounted on the stator device.

12. An atomic resolution information storage unit, comprising:
    a planar rotor device having an information storage area thereon for storing information;
    a planar array of electron beam emitters in close proximity to the rotor device to selectively direct an electron beam to the information storage area on the rotor device;
    focusing optics between the array of electron beam emitters and the planar rotor device to focus the plurality of electron beams each on one portion of the information storage area of the planar rotor device;
    driven mechanism on the rotor device for moving the rotor device relative to the array of electron beam emitters in a plane parallel to the plane of said array of electron beam emitters;
    a stator device in close proximity to the rotor device, the stator device being stationary relative to the moveable rotor device;
    driver mechanism on the stator device for electrostatically engaging the driven mechanism to move the rotor device relative to the array of electron beam emitters, thereby enabling the array of electron beam emitters to read from or write to different portions of the information storage area on the rotor device;
    electronic control circuitry on the stator device in electrical communication with the array of electron beam emitters to control the operation of the array of electron beam emitters; and
    a vacuum device in the atomic resolution information storage unit for maintaining the vacuum between the information storage area and the array of electron beam emitters.

13. The atomic resolution information storage unit as recited in claim 12, wherein the information storage area comprises a plurality of separate storage media areas, each area corresponding to one of the electron beam emitters.

14. The atomic resolution information storage unit as recited in claim 12, and further comprising a conductive device extending through the rotor device to connect the electronic control circuitry on the stator device to the array of electron beam emitters.

15. The atomic resolution information storage unit as recited in claim 12, wherein the electronic control circuitry on the stator device is in electrical communication with the planar rotor device to control the operation of the planar rotor device.

16. The atomic resolution information storage unit as recited in claim 12, wherein the electronic control circuitry on the stator device is in electrical communication with the planar rotor device to receive data from the information storage area on the planar rotor device.

17. The atomic resolution information storage unit as recited in claim 12, wherein the conductive device comprises conductive plugs on the rotor device connecting to a first set of pads on the stator device and a second set of pads on the array of electron beam emitters.

18. The atomic resolution information storage unit as recited in claim 12, further comprising first spacers between the rotor device and the array of electron beam emitters to maintain proper spacing therebetween, and second spacers between the rotor device and the stator device to maintain proper spacing therebetween.

19. The atomic resolution information storage unit as recited in claim 18, wherein the first and second spacers are disposed around the periphery of the rotor device to enable the rotor device to move relative to the array of electron beam emitters and the stator device.

20. The atomic resolution information storage unit as recited in claim 12, further comprising a bonding mechanism for connecting the rotor device, the array of electron beam emitters and the stator device together to form an information storage package.

21. The atomic resolution information storage unit as recited in claim 12, and further comprising a sealing mechanism associated with the array of electron beam emitters, the rotor device and the stator device to maintain a substantial vacuum in the information storage package.

22. The atomic resolution information storage unit as recited in claim 21, and further comprising a getter within the atomic resolution information storage unit to substantially maintain the vacuum therein.

23. An atomic resolution information storage unit, comprising:

a planar rotor device having an information storage area thereon for storing information;

a planar array of electron beam emitters on an emitter device in close proximity to the rotor device to selectively direct an electron beam to the information storage area on the rotor device;

focusing optics between the emitter device and the planar rotor device to focus the plurality of electron beams each on one portion of the information storage area of the planar rotor device;

driven mechanism on the rotor device for moving the rotor device relative to the emitter device in a plane parallel to the plane of said array of electron beam emitters;

a stator device in close proximity to the rotor device, the stator device being stationary relative to the moveable rotor device;

driver mechanism on the stator device for electrostatically engaging the driven mechanism to move the rotor device relative to the emitter device, thereby enabling the array of electron beam emitters to read from or write to different portions of the information storage area on the rotor device;

emitter driver circuitry on the emitter device in electrical communication with the array of electron beam emitters to control the operation of the array of electron beam emitters;

driver control circuitry on the stator device for driving the driver mechanism on the stator device; and a vacuum device in the atomic resolution information storage unit for maintaining the vacuum between the information storage area and the array of electron beam emitters.

24. The atomic resolution information storage unit recited in claim 23 and further comprising rotor control circuitry on the stator device in electrical communication with the planar rotor device to control the operation of the planar rotor device and to receive data from the information storage area on the planar rotor device.

25. The atomic resolution information storage unit recited in claim 23 wherein the driver control circuitry and the rotor circuitry are disposed underneath the electrodes on the stator device.

26. The atomic resolution information storage unit recited in claim 23 wherein the emitter driver electronics are disposed underneath the electron beam emitters.

* * * * *